W. D. WILKINSON & F. H. SEELEY.
NUT LOCK.
APPLICATION FILED AUG. 25, 1908.
919,667. Patented Apr. 27, 1909.
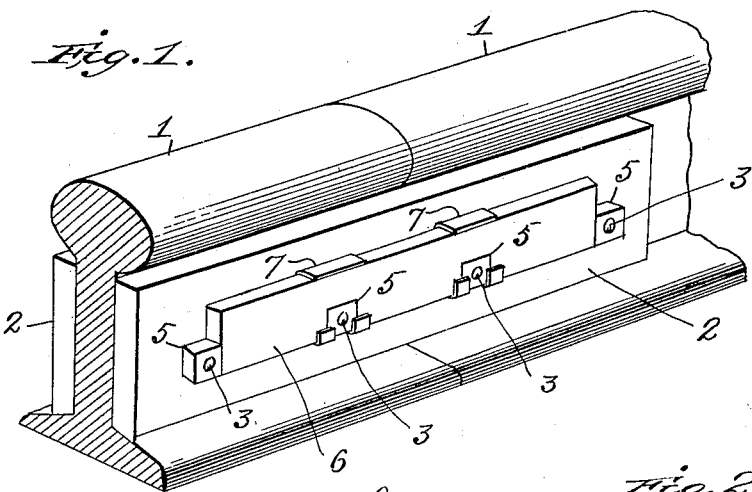
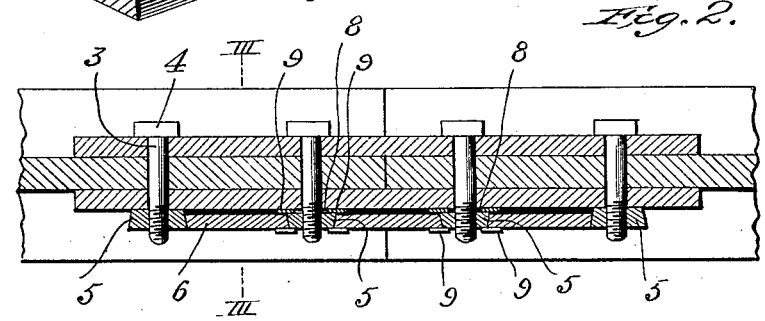
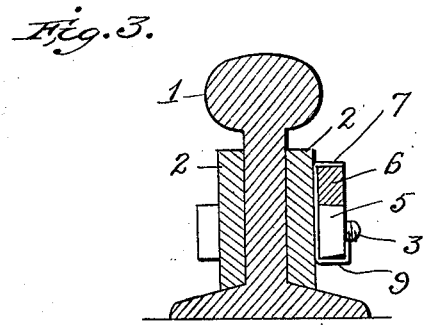
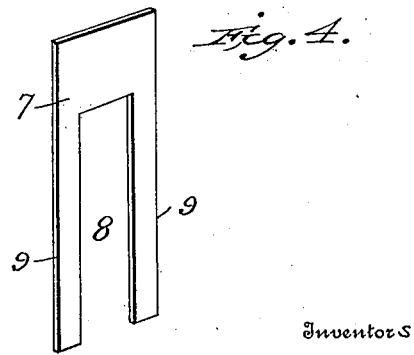
Witnesses
P. B. Hill
Edwin F. Fry
Inventors
William D. Wilkinson
Freeman H. Seeley
By Edwin L. Jewell
Attorney

UNITED STATES PATENT OFFICE.

WILLIAM D. WILKINSON, OF FINGER, AND FREEMAN H. SEELEY, OF BRINLY, TENNESSEE.

NUT-LOCK.

No. 919,667.      Specification of Letters Patent.      Patented April 27, 1909.

Application filed August 25, 1908. Serial No. 450,244.

*To all whom it may concern:*

Be it known that we, WILLIAM D. WILKINSON and FREEMAN H. SEELEY, citizens of the United States, residing, respectively, at Finger and Brinly, in the counties of McNairy and Chester and State of Tennessee, have invented certain new and useful Improvements in Nut-Locks, of which the following is a specification.

Our invention relates to nut locks, and has for its object to provide certain improvements in that class of nut locks employed with a plurality of nuts, such as are used with rail joints, whereby not only will the nuts be securely locked, but the locking device will be securely retained in place.

In the accompanying drawing: Figure 1 is a perspective view of the abutting ends of two rails with our improved device in position thereon. Fig. 2 is a horizontal sectional view taken on the line of the locking bolts. Fig. 3 is a transverse sectional view taken on the line III—III, Fig. 2. Fig. 4 is an enlarged detail, perspective view of the retaining clip.

Similar numerals of reference denote corresponding parts in the several views.

In the said drawing the reference numerals 1 denote the meeting ends of two rails, and 2 the fish plates usually employed therewith. Passing through registering apertures in the webs of said rails and said fish plates are the bolts 3, headed on one end at 4 to retain the fish plate on that side, and screw-threaded on their other ends to receive the usual nuts 5.

Our improved device consists of a bar 6, which, when four bolts are employed, is just long enough to contact with the inner sides of the two end nuts, and is recessed on its under side to fit over the two intermediate nuts, as shown. For each intermediate nut we provide a thin metal plate 7 centrally slotted at 8 from its bottom up to provide two arms, 9, the slot 8 being wide enough to straddle the bolts 3.

In assembling the device one of the plates 7 is first positioned on each of the intermediate bolts 3, and the nuts 5 thereof and of the end bolts are screwed to position. The bar 6 is then brought down upon said nuts with its recesses registering with the intermediate nuts, it being seen from Fig. 2 that said nuts and bar are slightly beveled to prevent outward movement of said bar when in position, so that said bar can be withdrawn from said nuts by an upward movement. With said bar positioned, the upper projecting edges of the plates 7 are bent over onto the top edge of said bar, and the lower projecting ends of their arms 9 are bent around said bar and nuts to engage the front faces of the two, as shown. By these means the bar 6 effectually prevents any rotation of the nuts 5, and is itself locked against any but an upward movement by the beveled faces of said nuts. Said upward movement, however, is prevented by the bent over upper ends of the plates 7, while the latter are locked against upward movement by the bent lower ends of their arms 9 engaging their nuts 5. The device may be unlocked either by straightening the bent lower ends of said arms 9, whereupon said bar 6 and plates 7 may be removed together vertically, or by straightening the bent upper ends of said plates 7, whereupon said bar alone may be removed vertically. The bottoms of the plates 7 may be closed and apertures provided therein to fit over the bolts 3.

Having thus described our invention, what we claim as new and desire to secure by Letters Patent, is:

1. In a nut lock, the combination with the body to be bolted, a plurality of bolts therefor, and nuts on said bolts, of means for engaging said nuts to lock them against rotation, consisting of a bar having recesses in one edge thereof to fit over the nuts, and means for locking said nuts locking means consisting of a slotted plate adapted to be bent over at its upper edge to engage the recessed bar and adapted at its lower end to be bent to engage the face of said recessed bar and said nuts and to be retained in position by said nuts independently of said nut locking means.

2. In a nut lock, the combination with the body to be bolted, a plurality of bolts therefor, and nuts on said bolts having beveled side faces, of a locking bar having beveled surfaces fitting against the side faces of said nuts to lock said nuts against rotation and to prevent withdrawal of said bar in one direction, and means for locking said bar to said nuts to prevent its withdrawal in the direction of its insertion, said means being held in position by said nuts independently of said bar.

3. In a nut lock, the combination with the body to be bolted, a plurality of bolts therefor and a beveled nut on each of said bolts, of a flexible plate apertured to fit onto one of said bolts and inserted thereon between the body to be bolted and the nut thereon and a bar having beveled surfaces fitting against the sides of said nuts, the ends of said plate being bent to engage said bar and said nuts, said plate being held in position by said nuts independently of said bar.

In testimony whereof we affix our signatures, in presence of two witnesses.

WILLIAM D. WILKINSON.
FREEMAN H. SEELEY.

Witnesses:
J. N. TILLMAN,
J. M. MALONE.